(12) United States Patent
Lee et al.

(10) Patent No.: US 10,057,583 B2
(45) Date of Patent: Aug. 21, 2018

(54) ENCODING METHOD OF IMAGE ENCODING DEVICE

(71) Applicant: ELECTRONICS AND TELECOMMUNICATIONS RESEARCH INSTITUTE, Daejeon (KR)

(72) Inventors: Sukho Lee, Daejeon (KR); Kyung Jin Byun, Daejeon (KR); Nak Woong Eum, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 147 days.

(21) Appl. No.: 15/232,542

(22) Filed: Aug. 9, 2016

(65) Prior Publication Data

US 2017/0257632 A1 Sep. 7, 2017

(30) Foreign Application Priority Data

Mar. 4, 2016 (KR) ........................ 10-2016-0026254

(51) Int. Cl.
| | |
|---|---|
| *H04N 19/159* | (2014.01) |
| *H04N 19/176* | (2014.01) |
| *H04N 19/182* | (2014.01) |
| *H04N 19/122* | (2014.01) |
| *H04N 19/61* | (2014.01) |
| *H04N 19/124* | (2014.01) |
| *H04N 19/13* | (2014.01) |
| *H04N 19/96* | (2014.01) |

(52) U.S. Cl.
CPC ......... *H04N 19/159* (2014.11); *H04N 19/122* (2014.11); *H04N 19/124* (2014.11); *H04N 19/13* (2014.11); *H04N 19/176* (2014.11); *H04N 19/182* (2014.11); *H04N 19/61* (2014.11); *H04N 19/96* (2014.11)

(58) Field of Classification Search
None
See application file for complete search history.

(56) References Cited

U.S. PATENT DOCUMENTS

| 8,588,301 | B2 * | 11/2013 | Kobayashi | ........... H04N 19/176 375/240.13 |
|---|---|---|---|---|
| 9,936,204 | B1 * | 4/2018 | Sim | ...................... H04N 19/147 |
| 2010/0046614 | A1 * | 2/2010 | Choi | .................... H04N 19/176 375/240.02 |
| 2011/0085601 | A1 * | 4/2011 | Lee | ........................ H04N 19/44 375/240.25 |
| 2011/0116550 | A1 * | 5/2011 | Lee | ........................ H04N 19/61 375/240.25 |
| 2011/0244484 | A1 | 10/2011 | Chae et al. | |

(Continued)

FOREIGN PATENT DOCUMENTS

| KR | 10-2015-0057801 A | 5/2015 |
|---|---|---|
| KR | 10-2015-0090803 A | 8/2015 |

(Continued)

*Primary Examiner* — Mohammad J Rahman

(57) ABSTRACT

Provided is an encoding method of an image encoding device including predicting an intra mode for coding blocks of a minimum size for intra prediction to generate an intra pixel; and using the intra mode of the coding blocks of the minimum size to restore an intra mode of coding blocks of a larger size.

8 Claims, 8 Drawing Sheets

(56) References Cited

U.S. PATENT DOCUMENTS

| | | | |
|---|---|---|---|
| 2012/0230403 A1* | 9/2012 | Liu | H04N 19/176 375/240.12 |
| 2013/0128961 A1* | 5/2013 | Kim | H04N 19/82 375/240.03 |
| 2013/0287094 A1* | 10/2013 | Song | H04N 19/105 375/240.02 |
| 2013/0329807 A1* | 12/2013 | Lim | H04N 19/176 375/240.18 |
| 2014/0037001 A1* | 2/2014 | Lim | H04N 19/50 375/240.12 |
| 2014/0219349 A1* | 8/2014 | Chien | H04N 19/105 375/240.13 |
| 2014/0233646 A1* | 8/2014 | Matsuo | H04N 19/00793 375/240.13 |
| 2015/0189289 A1 | 7/2015 | Kim et al. | |
| 2016/0134866 A1* | 5/2016 | Budagavi | H04N 19/11 375/240.12 |
| 2016/0330480 A1* | 11/2016 | Liu | H04N 13/0048 |
| 2018/0048895 A1* | 2/2018 | Jeon | H04N 19/159 |
| 2018/0091810 A1* | 3/2018 | Son | H04N 19/105 |

FOREIGN PATENT DOCUMENTS

| | | |
|---|---|---|
| KR | 10-2015-0115886 A | 10/2015 |
| WO | WO 2014/123650 A1 | 8/2014 |

\* cited by examiner

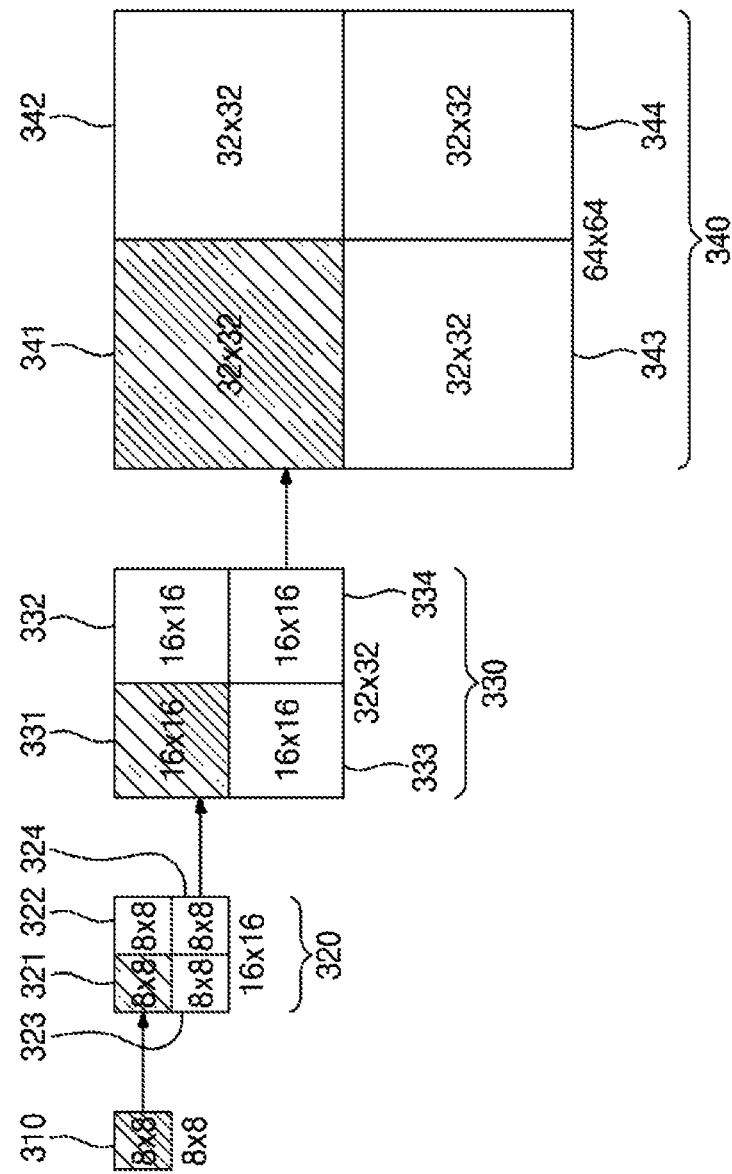

FIG. 7

```
Case(16x16 Coding Block):{
If(There is one or more 8x8 planar modes or dc modes)
  {
  If(There are two or more 8x8 planar modes)
      → 16x16 Prediction mode is planar (0, 0 is prediction number)
  else if(There are two or more 8x8 dc modes)
      → 16x16 Prediction mode is dc (1, 1 is prediction number)
  else if(Number of 8x8 planar modes >= Number of 8x8 dc modes)
      → 16x16 Prediction mode is planar
  else
      → 16x16 Prediction mode is dc
  } else
     {
     If(Number of 8x8 vertical modes(2~17) == Number of 8x8 horizontal
     modes(18~34)
      → 16x16 Prediction mode is dc
     else
      → 16x16 is average value of four 8x8 prediction modes(round off
        number to nearest whole number)
        }
     }
Case(32x32 coding block):{
If(There is one or more 16x16 planar modes or dc modes)

.......
       → 32x32 Prediction mode determination
     }
Case(64x64 coding block):{
If(There is one or more 32x32 planar modes or dc modes)

.......
       → 64x64 Prediction mode determination
     }
```

ENCODING METHOD OF IMAGE ENCODING DEVICE

CROSS-REFERENCE TO RELATED APPLICATIONS

This U.S. non-provisional patent application claims priority under 35 U.S.C. § 119 of Korean Patent Application No. 10-2016-0026254, filed on Mar. 4, 2016, the entire contents of which are hereby incorporated by reference.

BACKGROUND

The present disclosure herein relates to an electronic device and more particularly, to an encoding method of determining an intra prediction mode for providing high-speed performance at an image encoding device.

When compared with an existing H.264 technology, a high efficiency video coding (HEVC) technology has four times increased in prediction mode, and its macro block (16×16 pixels) that is the basic unit of encoding has been expanded to up to coding blocks of up to four sizes. The encoding expansion technology has two times increased coding compression efficiency but the complexity of implementation also increases by four times. In order to implement a real-time HEVC encoder, there is a need to calculate prediction errors that use an original image and a prediction image in 35 intra prediction modes corresponding to a block in units of 8×8 (4×4), 16×16, 32×32, 64×64 pixels.

The prediction error needs a lot of calculation and in addition to time taken for the calculation, resources needed for the calculation are excessively used. Thus, the chip size of hardware increases or in the case of software, there is a limitation in that computing power is excessively used. Thus, mobile or an IoT device that needs low power is difficult to use an HEVC encoder suitable for super resolution.

SUMMARY

The present disclosure provides an encoding method of sequentially recycling the direction mode of an intra coding block of a minimum size for a larger coding block of a larger size in that a surrounding coding block used in the intra prediction of the current coding block has similar direction.

An embodiment of the inventive concept provides an encoding method of an image encoding device including predicting an intra mode for coding blocks of a minimum size for intra prediction to generate an intra pixel; and using the intra mode of the coding blocks of the minimum size to restore an intra mode of coding blocks of a larger size.

In an embodiment, the coding block of the minimum size may correspond to an 8×8 pixel size, and the coding block of the larger size may include a coding block of a 16×16 pixel size, a coding block of a 32×32 pixel size, and a coding block of a 64×64 pixel size.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIGS. 5 and 6 are diagrams that schematically show a method of restoring the intra pixel of larger coding blocks by using the minimum coding block;

FIG. 7 illustrates an algorithm that uses the direction mode of a smaller coding block to restore the direction mode of a larger coding block.

DETAILED DESCRIPTION

In the following, embodiments of the inventive concept are described with reference to the accompanying drawings in order to describe the inventive concept in detail so that a person skilled in the art to which the inventive concept pertains may easily practice the technical spirit of the inventive concept.

Figure 1:
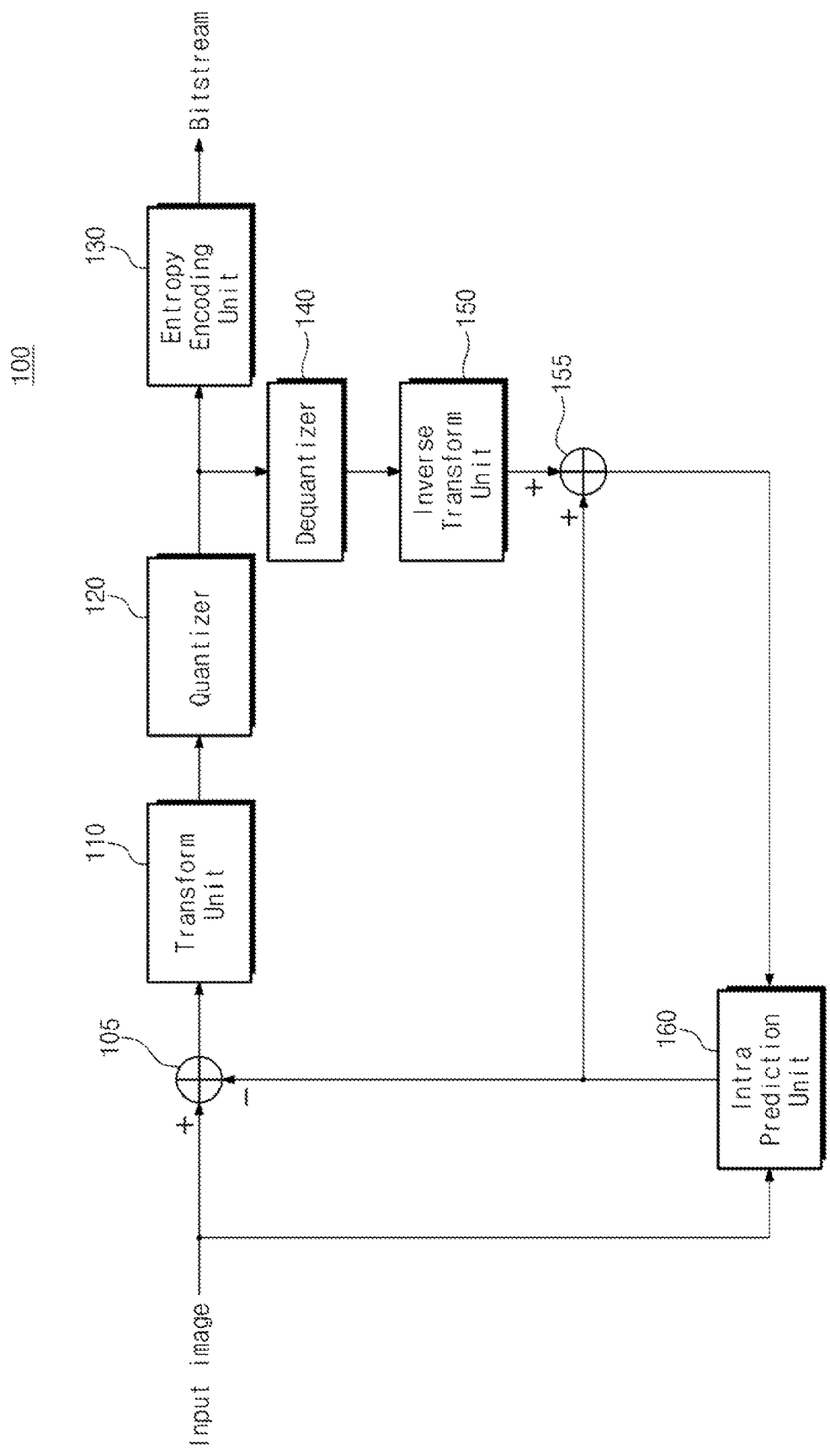
FIG. 1 is a block diagram of an image encoding device according to an embodiment of the inventive concept.

FIG. 1 is a block diagram of an image encoding device according to an embodiment of the inventive concept. Referring to FIG. 1, an image encoding device 100 may include a transform unit 110, a quantizer 120, an entropy encoding unit 130, a de-quantizer 120, an inverse transform unit 150, and an intra prediction unit 160. With the above-described configuration, the image encoding device 100 divides an input image into unit blocks to perform intra prediction and inter prediction on each block. In addition, the image encoding device 100 uses a predicted value to generate a prediction image, transforms, quantizes and entropy encodes the difference between the prediction image and an input image to generate a bit stream.

The image encoding device 100 may perform intra mode or inter mode encoding on the input image and output the bit stream. In the case of the intra mode, the intra prediction unit 160 would be activated. On the contrary, in the case of the inter mode, a motion compensator (not shown) would be selected. After generating a prediction block for an input block of the input image, the image encoding device 100 may encode the differential between an input block and a prediction block. In this case, the input image may mean an original image.

A subtractor 105 may generate a residual block by the differential between the input block and the generated prediction block. The transform unit 110 may perform transform on the residual block to output a transform coefficient. In addition, the quantizer 120 may use at least one of a quantization parameter and a quantization matrix to quantize the input transform coefficient to output a quantized coefficient. In this case, the quantization matrix may be input to the image encoding device and the input quantization matrix may be determined to be used by the image encoding device.

The entropy encoding unit 130 may perform entropy encoding based on the values calculated by the quantizer 120 or encoding parameter values calculated in the encoding process to output the bit stream. In the case where the entropy encoding is applied, a small number of bits are assigned to a symbol that has high possibility and a large number of bits are assigned to a symbol that has low possibility so that symbols are expressed, thus the size of a bit string for symbols to be encoded may decrease. Thus, the compression performance of image encoding may be improved through the entropy encoding. For the entropy encoding, the entropy encoding unit 130 may use encoding methods, such as exponential-golomb code, context-adaptive variable length coding (CAVLC), or context-adaptive binary arithmetic coding (CABAC).

The current encoded image needs to be decoded and stored to be used as a reference image. Thus, the coefficient quantized by the quantizer 120 is dequantized by the dequantizer 140 and inverse transformed by the inverse transform unit 150. The dequantized and inverse transformed coefficient becomes a restored residual block and is added to a prediction block through an adder 155, and a restoration block is generated.

For intra prediction, the intra prediction unit 160 uses only a 8×8 pixel (M×M where M is a size of pixel) block that is a minimum coding size. The intra prediction unit 160 may group the prediction modes of the predicted 8×8 coding block in a screen to restore the prediction mode of an larger coding block. In this way, the intra prediction unit 160 may sequentially restore the prediction modes of the larger coding blocks of a large size to configure 16×16 (2M×2M), 32×32 (4M×4M), 64×64 (16M×16M) intra prediction screens.

In addition, the intra prediction unit 160 splits a coding tree unit (CTU) in order to increase encoding efficiency. In this case, an error value according to each coding block size in addition to the 8×8 pixel size is needed. It is possible to calculate the error value by using the transform and sum of the difference between pixel values of original images of 8×8, 16×16, 32×32, 64×64 coding blocks on the current coding block position and each prediction image corresponding to the 8×8, 16×16, 32×32, 64×64 pixel blocks.

The image encoding device 100 according to an embodiment of the inventive concept has been briefly described above. The image encoding device 100 of the inventive concept may use an intra mode predicted on a coding block of a minimum size to restore intra modes of coding blocks of a larger size. Thus, the predicted intra mode of the larger coding blocks inherits the intra mode of a coding block of a minimum size that has representativeness. Thus, it is possible to save resources that are spent on generating the intra mode for the coding blocks of the larger size.

Figure 2:
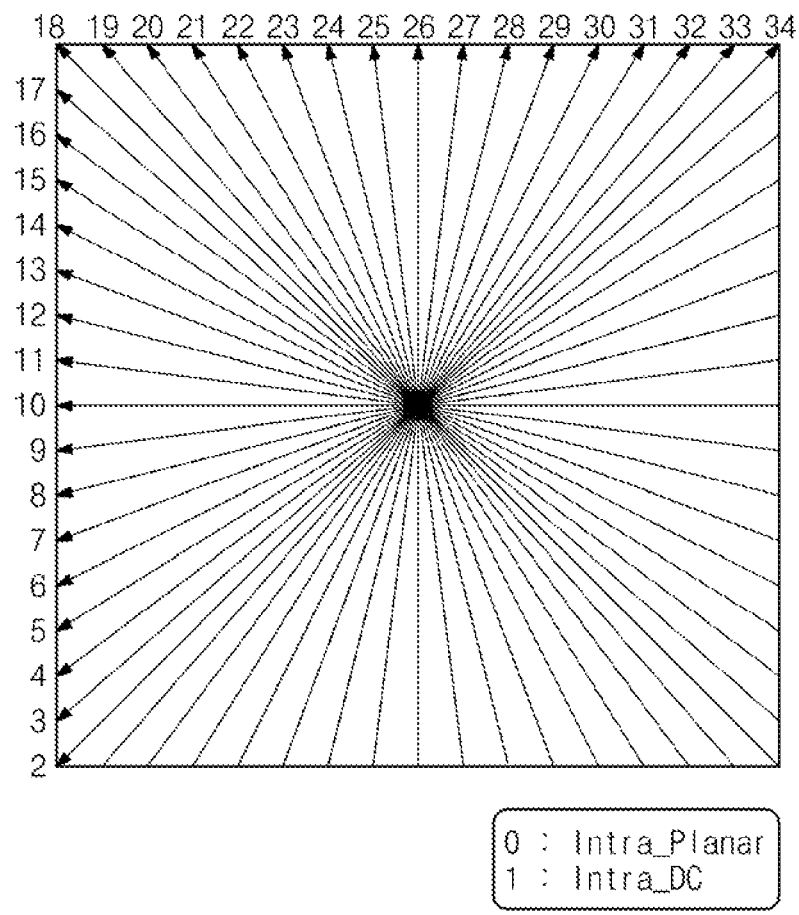
FIG. 2 illustrates intra prediction modes that are used in high efficiency video coding (HEVC) of the inventive concept.

FIG. 2 illustrates intra prediction modes that are used in high efficiency video coding (HEVC) of the inventive concept. Referring to FIG. 2, a planar mode 0, a DC mode 1, and prediction modes 2 to 33 that have different directions.

The intra prediction is a method of performing prediction by using the correlation between adjacent pixels in a single screen. Since there is generally a small amount of data capable of being referenced, it is not higher than inter prediction in prediction efficiency, but there are advantages in that independent encoding is possible and an encoding speed is fast. In contrast to that H.264/MPEG-4 AVC uses up to nine intra prediction modes, HEVC uses the DC mode, the planar mode, and the prediction modes that have 33 directions.

For the determination of the above-described prediction mode, the boundary pixels around a block are used as reference pixels for prediction. The boundary pixels are in a state that they are encoded and decoded before the encoding of the current block and may thus be used. In order to obtain a prediction mode that has various directions, after firstly smoothing surrounding reference pixels, it is possible to use a filtered reference pixel to perform interpolation. A brightness block uses all of 35 prediction modes irrespective of the size of the current block and a chrominance block further uses planar, vertical, horizontal, and DC prediction modes, and a DM_Chroma_Idx mode. The DM_Chroma_Idx mode is a mode that uses the prediction mode of a brightness block for a chrominance block without a change and may increase encoding efficiency in the case where the value properties between a brightness component and a chrominance component are similar.

Figure 3:
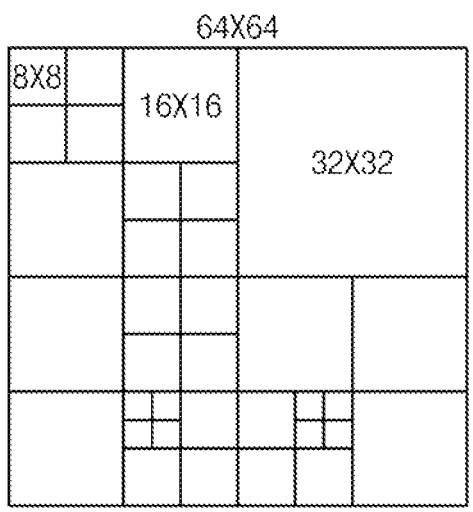
FIG. 3 shows coding tree units according to division according to an embodiment of the inventive concept.

FIG. 3 shows coding tree units according to division according to an embodiment of the inventive concept. Referring to FIG. 3, the intra prediction unit 160 of the inventive concept may divide a coding tree unit through comparison of an original image with an intra prediction image that is configured in such a manner that the predicted intra mode for a 8×8 coding block of a minimum size is inherited to coding blocks of a larger size.

The intra prediction unit 160 stores the prediction mode of four 8×8 coding blocks in Z-scan order, then compares it with a conditional expression or calculates the average of these values, predicts and restores the mode of a 16×16 coding block. In addition, the intra prediction unit 160 would use the mode value of four 16×16 coding blocks to restore the mode prediction value of a 32×32 coding block. The intra prediction unit 160 may use the mode value of four 32×32 coding blocks to predict a 64×64 pixel value and then generate a 64×64 pixel image.

The intra prediction unit 160 uses each of the above-described coding blocks to divide a coding tree unit and needs an error value to an original image according to each coding block size in addition to a 8×8 coding block. The error value is calculated by the transform and sum of the difference between 8×8, 16×16, 32×32, and 64×64 original image pixel values on the current coding block position and each prediction image corresponding to the 8×8, 16×16, 32×32, 64×64 pixel blocks.

Figure 4:
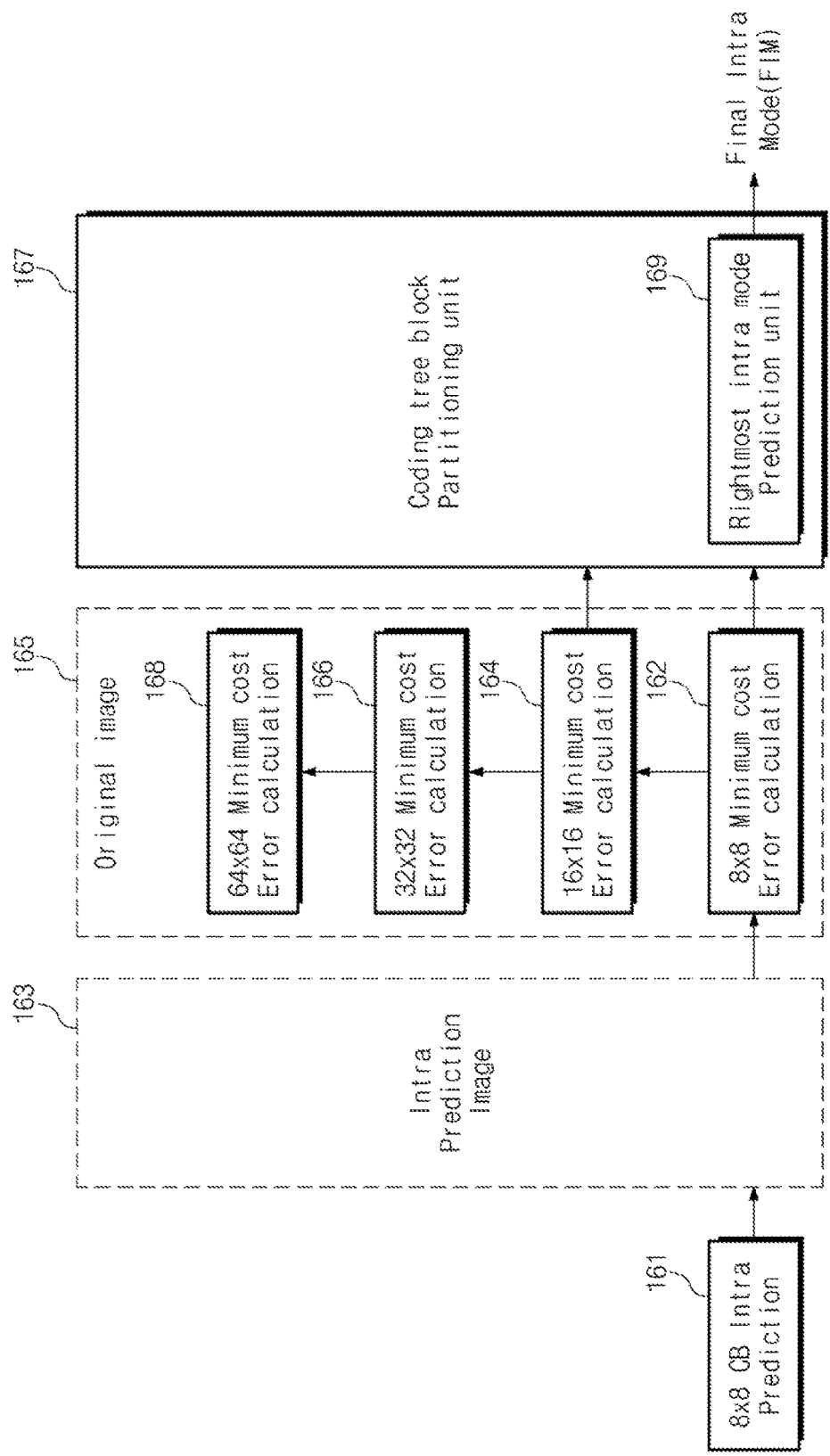
FIG. 4 is a block diagram that sequentially shows an encoding method of the inventive concept.

FIG. 4 is a block diagram that sequentially shows an encoding method of the inventive concept. Referring to FIG. 4, it is possible to use only a direction mode of a coding block of a minimum size to determine the direction mode of coding blocks of a larger size. In addition, it is possible to restore the intra mode image predicted in this way. In addition, it is possible to compare an original image with the restored intra prediction image that is configured in this way, to divide a coding tree unit. More details are provided below.

Firstly, the intra prediction unit 160 would determine an intra mode value for 8×8 coding blocks 161 of a minimum size. The intra prediction unit 160 (see FIG. 1) calculates the error between the prediction image and the original image 35 times in units of an 8×8 coding block 161 on the current processing block. As a result of error calculation, the optimal prediction mode of each of the 8×8 coding blocks 161 may be determined. Here, although the 8×8 coding block has been described as a unit of a minimum pixel, the inventive concept is not limited thereto. For example, it would be well understood that a 4×4 coding block may also be used as the unit of the minimum pixel.

When the optimal prediction mode of each of the 8×8 coding blocks of the minimum size is determined, an intra prediction image 163 that is made up of the determined prediction modes may be generated. The intra prediction image 163 is a result of a combination of a plurality of 8×8 coding blocks that has an individual direction mode. The intra prediction mode 163 that is combined by the using of the prediction mode of the 8×8 coding blocks is divided into coding tree units (CTU) in order to increase coding efficiency.

For the division of the coding tree unit, the error value between coding blocks according to each size of the intra prediction image 163 corresponding to the current coding block position and an original image 165 of a corresponding size would be calculated. That is, the error between 8×8, 16×16, 32×32, 64×64 original image pixel values on the current coding block position and each prediction image corresponding to the 8×8, 16×16, 32×32, 64×64 pixel blocks, and its result may be transformed and summed.

That is, when the sum of each of the error values of four 8×8 coding blocks is smaller than the error value of a single 16×16 coding block, the CTU may be determined to be a 16×16 mode. In addition, when the sum of each of the error values of four 16×16 coding blocks is smaller than the error value of a single 32×32 coding block, the CTU may be determined to be a 32×32 mode. In addition, when the sum of each of the error values of four 32×32 coding blocks is smaller than the error value of a single 64×64 coding block, the CTU may be determined to be a 64×64 mode. By applying a minimum cost error to the intra mode, the division of the CTU is performed.

As described above, a coding tree block partitioning unit 167 may process an intra mode for a larger coding block by using four smaller direction modes as a conditional expression or an average value to determine a final intra mode. When using the encoding method as proposed in the inventive concept, there is a need to calculate only an error value with respect to 35 intra modes corresponding to a minimum coding block (M×M pixels) and there is a need to calculate only an error value between the restored prediction image and the original image for the error of coding blocks of remaining three large sizes (2M×2M, 4M×4M, 16M×16M where M=8). Thus, it is possible to omit error calculation for the direction mode of coding blocks of a larger size. The determination of the final intra mode may be performed by a rightmost intra mode prediction unit 169. As a result, according to an embodiment of the inventive concept, resources and an amount of calculation that are needed for the calculation for the determination of the prediction mode and the determination of the CTU may be dramatically decreased. In addition, the CTU may be determined through the comparison of the error value calculated according to each coding block size.

Figure 5:
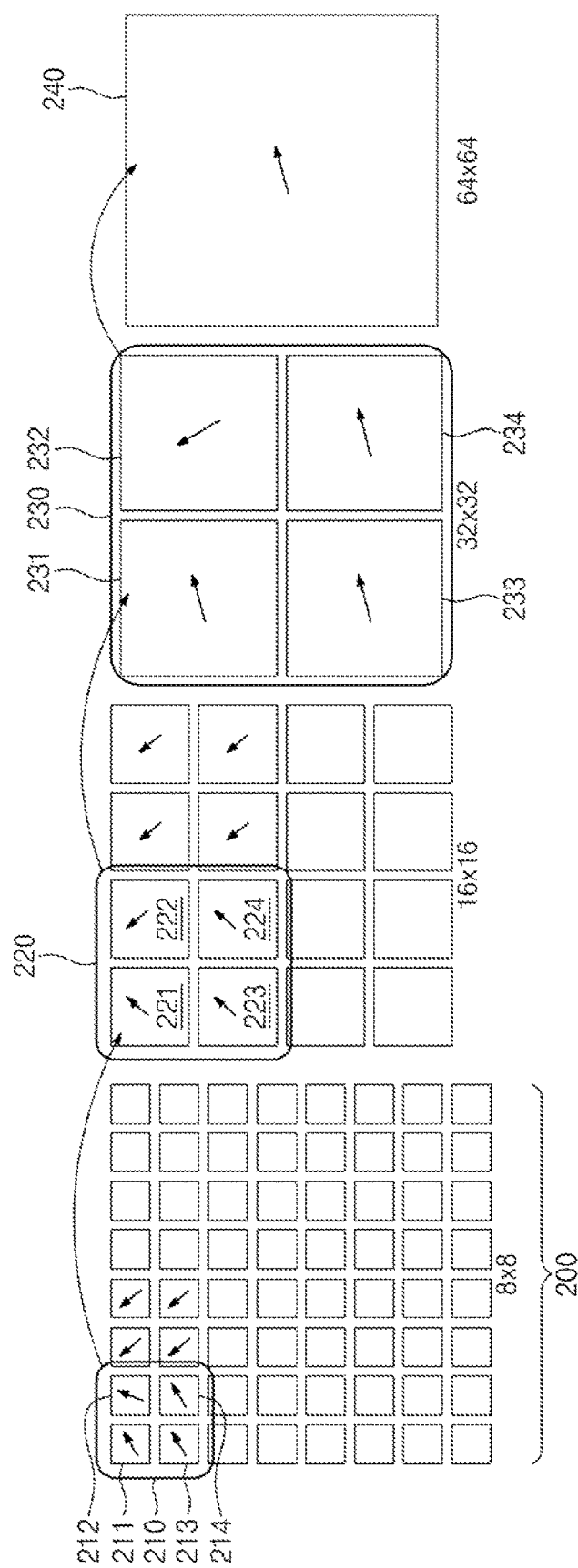

FIGS. 5 and 6 are diagrams that schematically show a method of restoring the intra pixel of larger coding blocks by using the above-described minimum coding block.

Referring first to FIG. 5, direction mode values would be stored in Z scan order in units of a minimum coding block (8×8 CB) with respect to an input image. A pixel image stored in this manner is shown by reference numeral 200. When a direction prediction image for a unit of a minimum coding block (8×8 CB) is provided, intra prediction for each of larger coding blocks (16×16, 32×32, 64×64) for the input image may be omitted. Instead, an intra mode for the larger coding blocks (16×16, 32×32, 64×64) would be sequentially calculated by the recycling of the intra prediction value predicted in units of the minimum coding block (8×8 CB).

For example, the prediction of the intra mode of a 16×16 coding block 221 may be calculated by the using of the mode value of each of 8×8 coding blocks 211 to 214. It is possible to use the direction mode of a group 210 of four 8×8 coding blocks to restore the direction mode of a single 16×16 coding block. That is, by processing the respective direction modes of the 8×8 coding blocks 211 to 214 by using average value calculation or a specific condition, the direction mode of the 16×16 coding block 221 may be determined. In this manner, it would be possible to restore the direction mode of each of 16×16 coding blocks 221, 222, 223, 224 . . . .

The prediction of the intra mode of a 32×32 coding block 231 may be calculated by the using of the mode value of each of the 16×16 coding blocks 221 to 222. It is possible to use the direction mode of a group 220 of four 16×16 coding blocks to restore the direction mode of a single 32×32 coding block. That is, by processing the respective direction modes of the 16×16 coding blocks 221 to 224 by using average value calculation or a specific condition, the direction mode of the 32×32 coding block 231 may be determined. In this manner, it would be possible to restore the direction mode of each of 32×32 coding blocks 231 to 234.

The prediction of the intra mode of a 64×64 coding block 240 may be calculated by the using of the mode value of each of the 32×32 coding blocks 231 to 234. It is possible to use the direction mode of a group 230 of four 32×32 coding blocks to restore the direction mode of a single 64×64 coding block 240. That is, by processing the respective direction modes of the 32×32 coding blocks 231 to 234 by using average value calculation or a specific condition, the direction mode of the 64×64 coding block 240 may be determined.

FIG. 6 schematically shows a method by which the intra prediction mode of a coding block of a minimum size according to an embodiment of the inventive concept is inherited to coding blocks of a larger size. Referring to FIG. 6, the predicted intra mode of an 8×8 coding block 310 of a minimum size may be inherited to coding blocks 320, 330 and 340 of a larger size. The respective direction mode values of coding blocks of the stored minimum size would be stored in Z scan order. As an example, the predicted direction mode of the 8×8 coding block 310 is used for the direction mode restoration of the 16×16 coding block 320. For example, the average value of the respective direction modes of the 8×8 coding blocks 321 to 324 may be determined to be the direction mode of the 16×16 coding block 320. The restored direction mode of the 16×16 coding block 320 is used for the direction mode restoration of the 32×32 coding block 330. For example, the average value of the respective direction modes of the 16×16 coding blocks 331 to 334 may be determined to be the direction mode of the 32×32 coding block 330. The predicted direction mode of the 32×32 coding block 330 is used for the direction mode restoration of the 64×64 coding block 340. For example, the average value of the respective direction modes of the 32×32 coding blocks 341 to 344 may be determined to be the direction mode of the 64×64 coding block 340.

FIG. 7 illustrates an algorithm that uses the direction mode of a coding block of a smaller size to restore the direction mode of a larger coding block. Referring to FIG. 7, when the value of intra pixels predicted on a minimum coding block (8×8) is provided, the direction modes of 16×16, 32×32, and 64×64 coding blocks may be sequentially calculated by an exemplary algorithm. The prediction mode restoration of the 16×16 coding block is described.

Firstly, a processing procedure for the case where there is one or more planar or DC modes among the provided direction modes of the 8×8 coding blocks is processed in 'if' syntax. In this case, if there are two or more planar modes among the respective direction modes of four 8×8 coding blocks, the prediction mode of a 16×16 coding block may be restored to '0' that corresponds to the planar mode. If there are two or more DC modes among the respective direction modes of four 8×8 coding blocks, the prediction mode of the 16×16 coding block may be determined to be '0' that corresponds to the DC mode. If the number of the planar modes among the respective direction modes of four 8×8 coding blocks is equal to or larger than the number of the DC modes, the prediction mode of the 16×16 coding block may be determined to be '0' that corresponds to the planar mode. In other cases excluding the above cases, the prediction mode of the 16×16 coding block would be determined to be '1' that corresponds to the DC mode. In addition, the 'if' syntax is closed.

A processing procedure for the case where there is no planar or DC mode among the provided direction modes of the 8×8 coding blocks is processed in 'else' syntax. If the number of vertical modes (2 to 17) among the respective direction modes of four 8×8 coding blocks is equal to the number of horizontal modes (18 to 34), the prediction mode of the 16×16 coding block may be restored to '1' that corresponds to the DC mode. In other cases, the average value of the respective direction modes of the four 8×8 coding blocks may be determined to be the prediction mode of the 16×16 coding block. When calculating the average value, it would be possible to round off number to nearest whole number.

The prediction mode restoration of a 32×32 coding block may also be performed in substantially the same manner as the prediction mode restoration of the 16×16 coding block. In addition, the prediction mode restoration of a 64×64 coding block may also be performed in substantially the same manner as the prediction mode restoration of the 16×16 coding block.

Figure 8:
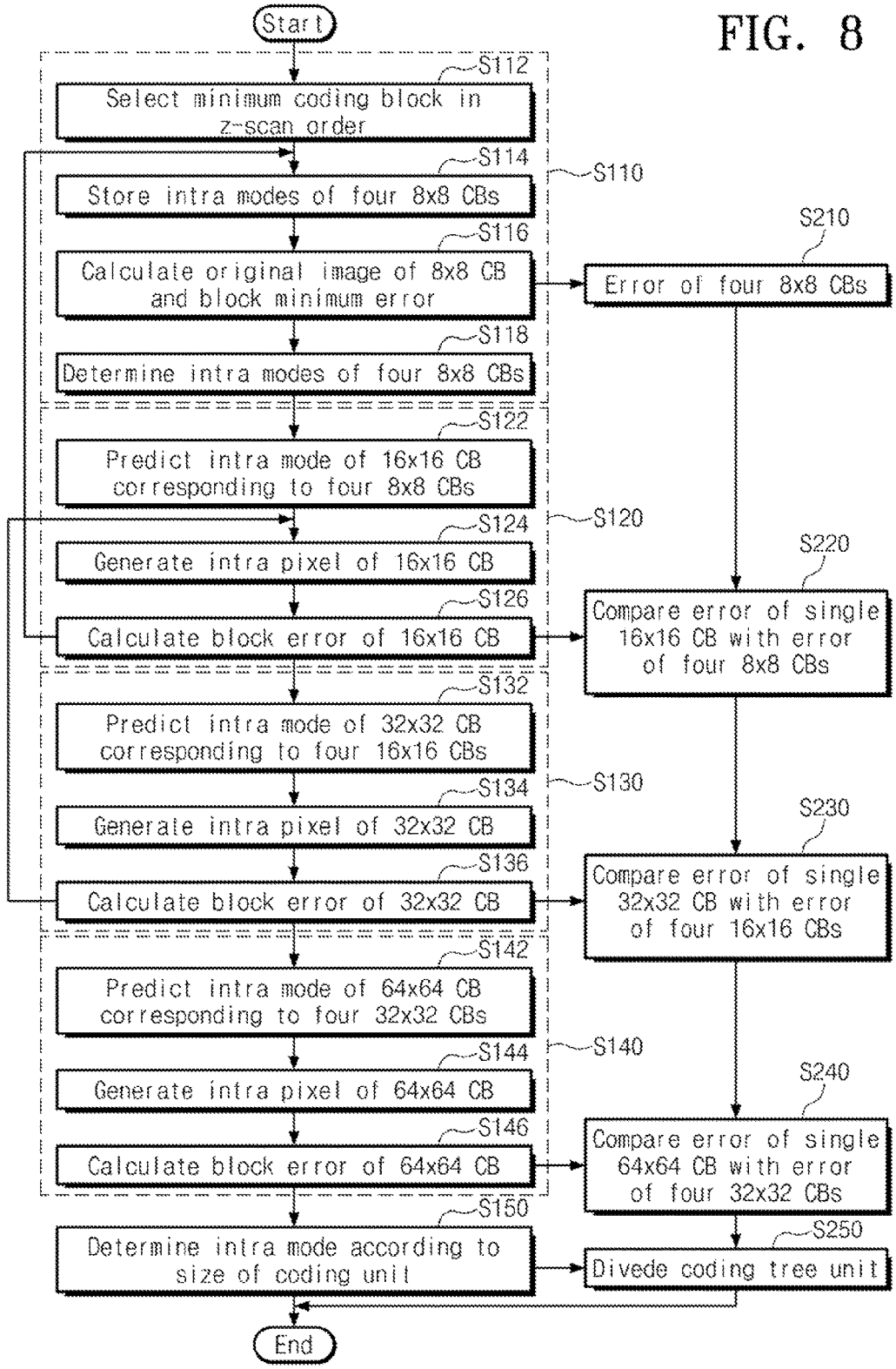
FIG. 8 is a flowchart of an encoding method according to an embodiment of the inventive concept.

FIG. 8 is a flowchart of an encoding method according to an embodiment of the inventive concept. Referring to FIG. 8, it is possible to use the intra mode of the coding block of a minimum size according to the encoding method of the inventive concept so that the intra mode of coding blocks according to each size may be restored. In addition, it is possible to use a calculation result of an intra mode according to each size to divide the CTU in real time. In steps S110, S120, S130, S140, and S150, the intra mode restoration of coding blocks of a larger size is performed by the using of the intra mode of a coding block of a minimum size. In addition, it is possible to perform steps S210, S220, S230, and S250 to divide the CTU of the inventive concept.

In step S112, the intra prediction image 163 (see FIG. 4) would be provided. Then, a coding block of a minimum unit (8×8) would be selected in Z scan order and stored in a memory.

In step S114, intra pixels that correspond to four 8×8 coding blocks, respectively among stored intra prediction images would be generated and stored.

In step S116, the block error between each of the 8×8 coding blocks and an original image is calculated. In this case, the minimum error value of each of the 8×8 coding blocks would be delivered to step S210.

In step S118, the intra mode of each of the 8×8 coding blocks would be determined.

In step S122, the determined intra mode of each of the 8×8 coding blocks would be used so that the intra mode of a 16×16 coding block of a larger size is predicted. The prediction would be performed through the algorithm in FIG. 7 as described earlier.

In step S124, intra pixels that correspond to four 16×16 coding blocks, respectively among prediction images would be generated and stored.

In step S126, the block error between each of the 16×16 coding blocks and an original image is calculated. In this case, the minimum error value of each of the 16×16 coding blocks would be delivered to step S220. In addition, the intra mode of each of the 16×16 coding blocks would also be determined. In addition, the procedure may return to step S144 in order to use four minimum coding blocks to be selected next to restore the intra mode of a larger coding block. The operation loop would be repeated until the operations are completed on all selected minimum coding blocks.

In step S132, the intra mode of each of the 16×16 coding blocks would be used so that the intra mode of a 32×32 coding block of a larger size is predicted. The prediction would be performed through the algorithm in FIG. 7 as described earlier.

In step S134, intra pixels that correspond to four 32×32 coding blocks, respectively among prediction images would be generated and stored.

In step S136, the block error between each of the 32×32 coding blocks and an original image is calculated. In this case, the minimum error value of each of the 32×32 coding blocks would be delivered to step S230. In addition, the intra mode of each of the 32×32 coding blocks would also be determined. In addition, the procedure may return to step S124 in order to use four 16×16 coding blocks to be selected next to restore the intra mode of a larger coding block. The operation loop would be repeated until all selected 16×16 coding blocks are exhausted.

In step S142, the intra mode of each of the 32×32 coding blocks would be used so that the intra mode of a 64×64 coding block of a larger size is predicted. The prediction would be performed through the algorithm in FIG. 7 as described earlier.

In step S144, an intra pixel corresponding to the 64×64 coding block would be generated and stored.

In step S146, the block error between each of the 64×64 coding blocks and an original image is calculated. In this case, the minimum error value to the 64×64 coding block would be delivered to step S240. In addition, the intra mode of each of the 64×64 coding blocks would also be determined.

In step S150, an intra mode for coding blocks according to a size generated through the above-described steps may be determined.

In steps S210, S220, S230, and S240, the sum of block error values of coding blocks of a smaller size would be compared with the block error value of a single coding block of a larger size. In addition, the CTU may be determined with reference to the smaller of the two error values. The operation may be performed in step S250.

According to an encoding device and method according to embodiments of the inventive concept, it is possible to use only an intra prediction block of a minimum size to predict an intra screen of a larger size and divide the CDT of an intra frame. Such a technology may decrease, drastically (by ¾ or more), hardware and software resources and an amount of calculation that are needed for an intra mode determination and the division of the CTD when implementing a real-time HEVC encoder.

According to HEVC encoder implementation according to an embodiment of the inventive concept, it is possible to implement a low-power, super-resolution HEVC encoder because in a hardware aspect, a small chip size and a low-power property are provided and in a software aspect, it is possible to decrease computing power.

Although the detailed description of the inventive concept has provided particular embodiments, there may be many variations without departing from the scope of the inventive concept. Therefore, the scope of the inventive concept should not be limited to the above-described embodiments but should be defined by equivalents of the following claims as well as the following claims.

What is claimed is:

1. An encoding method of an image encoding device, the encoding method comprising:
   predicting an intra mode for coding blocks of a minimum size for intra prediction to generate an intra pixel; and
   re-using the intra mode of the coding blocks of the minimum size to determine an intra mode of coding blocks of a larger size,
   wherein the coding block of the minimum size corresponds to a coding block of a 4×4 pixel size or 8×8 pixel size,
   wherein the intra mode of the coding block of the larger size is predicted through average calculation in a case where there is no planar mode or DC mode in an intra mode of four coding blocks of the minimum size, and
   wherein the intra mode of the coding block of the larger size is predicted as the planar mode in a case where there are two or more planar mode coding blocks in the intra mode of the four coding blocks of the minimum size, and the intra mode of the coding block of the larger size is predicted as the DC mode in a case where there are two or more DC modes in the intra mode of the four coding blocks of the minimum size.

2. The encoding method of claim 1, wherein the intra mode of the coding block of the larger size is predicted as the planar mode in a case where the number of planar modes in the intra mode of the four coding blocks of the minimum size is equal to or larger than the number of the DC modes.

3. The encoding method of claim 1, wherein the intra mode of the coding block of the larger size is determined based on an average value of the intra modes of the four coding blocks in a case where there is no planar mode or DC mode in the intra modes of the four coding blocks of the minimum size.

4. The encoding method of claim 3, wherein the intra mode of the coding block of the larger size is determined to be the DC mode in a case where there is no planar mode or DC mode in the intra modes of the four coding blocks of the minimum size and the number of vertical modes is equal to the number of horizontal modes.

5. An encoding method of an image encoding device, the encoding method comprising:
   predicting an intra mode for coding blocks of a minimum size for intra prediction to generate an intra pixel; and
   re-using the intra mode of the coding blocks of the minimum size to determine an intra mode of coding blocks of a larger size,
   wherein the coding block of the minimum size corresponds to a 8×8 pixel size, and the coding block of the larger size comprises a coding block of a 16×16 pixel size, a coding block of a 32×32 pixel size, and a coding block of a 64×64 pixel size, and
   wherein a sum of an error between each of four coding blocks of the 8×8 pixel size and an original image is compared to an error between a single coding block of the 16×16 pixel size and the original image to determine a size of a coding tree unit.

6. The encoding method of claim 5, wherein the coding tree unit is determined to be the 8×8 pixel size in a case where the sum of the error between each of the four coding blocks of the 8×8 pixel size and the original image is smaller than the error between the single coding block of the 16×16 pixel size and the original image.

7. An encoding method of an image encoding device, the encoding method comprising:
   predicting an intra mode for coding blocks of a minimum size for intra prediction to generate an intra pixel; and
   re-using the intra mode of the coding blocks of the minimum size to determine an intra mode of coding blocks of a larger size,
   wherein the coding block of the minimum size corresponds to a 8×8 pixel size, and the coding block of the larger size comprises a coding block of a 16×16 pixel size, a coding block of a 32×32 pixel size, and a coding block of a 64×64 pixel size, and
   wherein a sum of an error between each of four coding blocks of the 16×16 pixel size and an original image is compared to an error between a single coding block of the 32×32 pixel size and the original image to determine a size of a coding tree unit.

8. An encoding method of an image encoding device, the encoding method comprising:
   predicting an intra mode for coding blocks of a minimum size for intra prediction to generate an intra pixel; and
   re-using the intra mode of the coding blocks of the minimum size to determine an intra mode of coding blocks of a larger size,
   wherein the coding block of the minimum size corresponds to a 8×8 pixel size, and the coding block of the larger size comprises a coding block of a 16×16 pixel size, a coding block of a 32×32 pixel size, and a coding block of a 64×64 pixel size, and
   wherein a sum of an error between each of four coding blocks of the 32×32 pixel size and an original image is compared to an error between a single coding block of the 64×64 pixel size and the original image to determine a size of a coding tree unit.

* * * * *